United States Patent [19]

Matsuura et al.

[11] 4,113,749

[45] Sep. 12, 1978

[54] PROCESS FOR PRODUCING ANTHRONE

[75] Inventors: Ryo Matsuura, Yamato; Shuichi Nakatani, Yokohama; Kazuya Nagaoka, Yokohama; Katsuhiko Hioki, Yokohama, all of Japan

[73] Assignee: Kawasaki Kasei Chemicals Ltd., Tokyo, Japan

[21] Appl. No.: 818,761

[22] Filed: Jul. 25, 1977

[51] Int. Cl.$^2$ ................................................. C09B 3/64
[52] U.S. Cl. ..................................... 260/351; 260/704
[58] Field of Search ................................ 260/351, 704

[56] References Cited

U.S. PATENT DOCUMENTS 1,890,040  12/1932  Luttringhaus et al. ............... 260/369

OTHER PUBLICATIONS

Meyer, *Liebigs Annalen der Chemie*, 379, pp. 60–61.
Sims, *Biochemical Journal* 92, pp. 621–631 (1964).
*Elsevier's Encyclopaedia of Organic Chemistry*, vol. 13, series III, 1946, pp. 389, 390, 396.

*Primary Examiner*—Allen B. Curtis
*Assistant Examiner*—Raymond K. Covington
*Attorney, Agent, or Firm*—Oblon, Fisher, Spivak, McClelland & Maier

[57] ABSTRACT

Anthrone is produced by an intramolecular condensation of hydroanthraquinone such as tetrahydroanthraquinone or dihydroanthrahydroquinone by heating it in the absence of oxygen with or without an inert solvent.

15 Claims, No Drawings

PROCESS FOR PRODUCING ANTHRONE

BACKGROUND OF THE INVENTION

1. Field of the Invention

The present invention relates to a novel process for producing anthrone which is useful as intermediates for dyes, photosensitizers, analytical reagents and other organic compounds. The anthrone is especially useful as intermediates for benzanthrone derivatives as dyes.

2. Description of the Prior Arts

Anthrone has been produced by reducing anthraquinone with a mineral acid and a metal such as copper, aluminum, iron, zinc or tin. For example, it has been known that anthrone is produced by reducing anthraquinone with tin and hydrochloric acid in about 7 times of acetic acid in "Organic Syntheses Vol. 1 pages 60 to 61." It has been also known that anthrone is produced by reducing anthraquinone with copper or iron and sulfuric acid and anthrone is converted to benzanthrone.

These conventional processes for producing anthrone have industrial disadvantages that expensive anthraquinone is used as a raw material and a large amount of powdery metal and a mineral acid which are expensive and not easily post-treated should be used and 7 to 10 times of a solvent to the raw material should be used.

The inventors have studied to produce anthrone without such disadvantages.

SUMMARY OF THE INVENTION

It is an object of the present invention to provide a process for producing anthrone without using expensive raw materials. It is another object of the present invention to provide a process for producing anthrone without a pollution of waste water caused by using powdery metal and a mineral acid as a reducing agent. The foregoing and other objects of the present invention have been attained by an intramolecular condensation of hydroanthraquinone especially tetrahydroanthraquinone or its isomer of dihydroanthrahydroquinone by heating it in the absence of oxygen with or without an inert solvent.

DETAILED DESCRIPTION OF THE PREFERRED EMBODIMENTS

Anthronizing reaction is resulted by an intramolecular condensation of hydroanthraquinone such as 1,4,4a,-9a-tetrahydroanthraquinone and 1,4-dihydroanthrahydroquinone under a dehydration by heating it in the absence of oxygen.

The hydroanthraquinones used as the starting material include tetrahydroanthraquinones (hereinafter referring to as THAQ) such as 1,4,4a,9a-THAQ and 1,2,3,4-THAQ and dihydroanthrahydroquinones (hereinafter referring to as DHAHQ) such as 1,4-DHAHQ and a mixture thereof and a mixture of 1,4,4a,5,8,8a,-9a,10a-octahydroanthraquinone and dihydroanthraquinone and quinhydrone compounds.

It is preferable to use 1,4,4a,9a-tetrahydroanthraquinone (1,4,4a,9a-THAQ) or its isomer of 1,4-dihydroanthrahydroquinone (1,4-DHAHQ).

The 1,4,4a,9a-THAQ can be easily produced by Diels-Alder reaction of 1,4-naphthoquinone with butadiene. The 1,4-DHAHQ can be easily produced by an enolization of 1,4,4a,9a-THAQ with an acid or a base.

The reaction mechanism of the intramolecular condensation as anthronizing reaction is not clear though the general reactions are as follows.

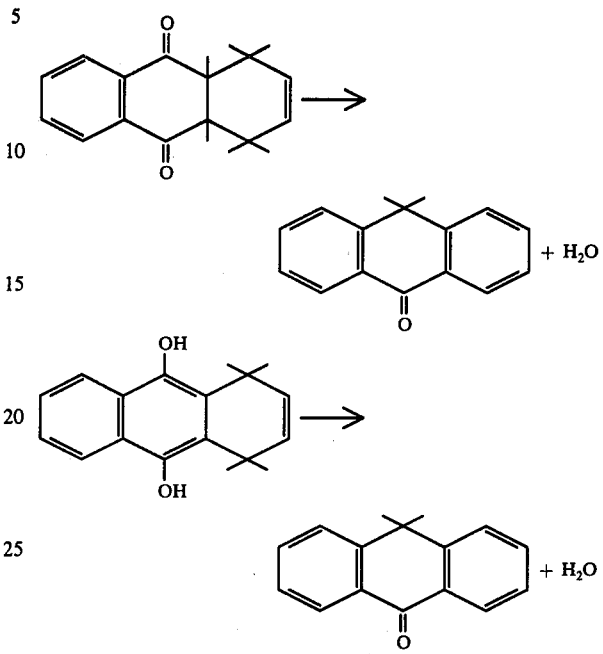

It is preferable to use 1,4-DHAHQ in the absence of a solvent, a base, because the reaction velocity is high. However, the reaction velocity is enough high in the presence of a solvent with or without a base even though THAQ is used, because THAQ is converted to DHAHQ by the enolization.

The process of the present invention is carried out in the absence of a solvent. The starting material of DHAHQ or THAQ is charged in a reactor which can be uniformly and rapidly heated and which may equip with a stirrer. Air in the reactor is purged in vacuum or by substituting with an inert gas of nitrogen. The content is heated at suitable temperature for suitable time to attain the intramolecular condensation. After the reaction, the reaction mixture in the reactor contains anthrone and by-products of anthraquinone, anthracene and the unreacted materials of DHAHQ or THAQ and polymers thereof.

When the content of anthrone in the crude product is high, the crude product can be used as the raw material for the next reaction step such as the step of producing benzoanthrone. Anthrone can be separated by extracting with a solvent which does not dissolve the by-products but dissolves anthrone such as an aromatic hydrocarbon e.g. benzene. Anthrone can be purified by a recrystallization.

The intramolecular condensation can be carried out in the presence of a solvent. The solvent should be non-oxidizing solvent because hydroanthraquinones are easily oxidized.

Suitable solvents include polar solvents such as alcohols such as ethanol, propanol, butanol, octanol, ethyleneglycol, propyleneglycol and glycerine; cellosolves such as ethyl cellosolve; ketones such as methyl ethyl ketone; amines such as propylamine, butylamine, piperidine, heterocyclic basic solvent such as pyridine, picoline; dimethylformamide; and nonpolar solvents such as aromatic hydrocarbons such as toluene; xylene, cumene, cymene and methylnaphthalene; haloaromatic hydrocarbons such as trichlorobenzene, chloronaphthalene; ethers such as diethyl ether; and inorganic solvents such as water etc.

The amount of the solvent is not critical and it is preferable to dip the starting material. When the boiling point of the solvent is lower than the reaction temperature, the reaction is carried out in an autoclave.

When the intramolcular condensation of 1,4-DHAHQ is carried out in the absence of a solvent, the reaction temperature is higher than 150° C preferably 170° to 500° C preferably 250° to 450° C. When the reaction temperature is low, the reaction time is long. When the reaction temperature is high, the reaction time can be short. For example, the reaction time is longer than 60 min. at 250° C and is shorter than 60 min. so as to decrease the side-reaction at higher than 300° C.

When the intramolecular condensation of 1,4,4a,9a-THAQ is carried out in the absence of a solvent, the reaction temperature is higher than 200° C preferably 250° to 350° C especially about 300° C. When the reaction temperature is high, the reaction time can be short. For example, the reaction time is about 180 min. at 300° C and is shorter than 180 min. so as to decrease the side-reaction, at higher than 300° C.

When the intramolecular reaction is carried out in the presence of a solvent, the side-reaction of hydroanthraquinones especially 1,4,4a,9a-THAQ or 1,4-DHAHQ such as anthraquinonizing reaction by the dehydrogenation can be inhibited and the optimum reaction temperature can be lowered. The industrial operation can be easily attained. When the intramolecular reaction of THAQ or DHAHQ is carried out, the reaction temperature is higher than 100° C preferably about 130° to 350° C especially 200° to 300° C.

The reaction time is dependent upon the kind of starting material, and the solvent and the reaction temperature.

When 1,4-DHAHQ is used as the starting material and glycerine is used as the solvent, the intramolecular condensation is preferably carried out for shorter than 1 hour at 250° C or for about 6 to 8 hours at 200° C.

The intramolecular condensation of 1,4-DHAHQ is preferably carried out for longer than 4 hour at 230° C when β-methylnaphthalene is used.

In general, when the reaction temperature is higher, the reaction velocity for producing anthrone is increased but anthrone is further converted to the by-products. Accordingly, the reaction time should be short.

Oxygen should be removed from the reaction system because the starting materials are easily oxidized to form anthraquinone and the selectivity of anthrone is decreased. When the oxygen content is quite small in the reaction system, it is considered to be absence of oxygen. The oxygen containing gas such as air in the reactor in removed by purging with an inert gas which is inert to the starting material and anthrone or by sucking in vacuum. The inert gas can be nitrogen, rare gas, carbon dioxide gas etc. and it is preferably nitrogen having high purity because of economical.

The reaction pressure can be the atmospheric pressure to several tens atm.

For example, the intramolcular condensation can be carried out by feeding nitrogen into the reactor under the atmospheric pressure to remove water.

The intramolecular reaction can be also carried out by removing air from an autoclave in vacuum after charging the starting material and then the autoclave is heated with or without feeding an inert gas, under the auto-pressure such as several atm.

The reaction pressure is dependent upon the amount of the starting material to the volume of the reactor and the reaction temperature when a solvent is not added. It is preferable, as the operation, that the initial pressure is the atmospheric pressure. The reaction pressure can be controlled by condensing steam and discharging water from the reactor. When the solvent is used, the reaction pressure is decided depending upon the kind of the solvent and the reaction temperature. When the solvent having high boiling point is used, the reaction pressure can be the atmospheric pressure, advantageously.

The intramolecular condensation can be carried out in a batch system as well as a continuous system by using a continuous type reactor such as a tubular reactor.

In the intramolecular condensation, it is sometimes preferable to add a base.

Suitable bases include alkali metal compounds such as alkali hydroxides e.g. sodium or potassium hydroxide; alkali carbonates e.g. sodium carbonate or bicarbonate; basic ion-exchange materials such as zeorite; alkali metal alcoholates e.g. sodium or potassium ethylate; t-amines e.g. triethylamine, tripropylamine; strong basic ion-exchange resins, etc. The amount of the base is about 1 to 100 mole % to the starting material and it is dependent upon the kinds of the starting material, the solvent and the base. When glycerine is used as the solvent, 5 to 50 mole % of sodium hydroxide is preferably added to 1,4,4a,9a-THAQ.

In the latter reaction, the reaction temperature is in a range 100° to 250° C preferably 120° to 180° C. The reaction time is selected depending upon the kinds of the starting material and the solvent and the reaction temperature and the amount of a base. The concentration of the starting material in the solvent is in a range of several % to about 30%.

When a nonpolar solvent such as xylene is used, it is preferable to add an amine such as triethylamine as the base. It is also possible to use a mixture of a nonpolar solvent and an alcohol with alkali metal hydroxide such as sodium hydroxide.

It is especially preferable to use an aqueous solution of a base such as alkali metal hydroxides, carbonates and ammonia.

Water soluble organic solvents such as alcohols e.g. ethanol, glycerin etc. can be mixed with the aqueous solution. The content of the base in the solution is preferably about 2 to 20 wt.%. The amount of the base to the starting material is 1 to 100 mole %.

When the aqueous solution of a base is used, the reaction temperature is in a range of 100° to 250° C preferably 120° to 180° C under elevated pressure. The reaction time is dependent upon the base and the reaction temperature and it is usually 30 min. to 5 hours preferably 1 to 4 hours at 150° C in an aqueous solution of an alkali metal hydroxide.

When the aqueous solution of a base or a polyhydric or a monohydric alcohol is used, there are various advantages such as an accident can be prevented, the solvent is economical and easily treated and the reaction can be performed at lower temperature.

The process of the present invention is novel, simple and economical process. In comparison with the conventional processes, it is unnecessary to use a large amount of a mineral acid such as hydrochloric acid and sulfuric acid and expensive powdery metal such as iron, zinc and tin and a large amount of a solvent, whereby the pollution can be easily prevented.

The present invention will be further illustrated by certain examples in detail.

EXAMPLE 1

In a 20 cc heat resistant autoclave having a length of 17 cm, 1.15 g of 1,4,4a,9a-THAQ was charged and air was purged with nitrogen gas. The autoclave was closed and heated at 300° C for 180 min. and it was cooled to decrease the pressure to the atmospheric pressure. The water remained in the reactor was vaporized to remove it, and 1.07 g of the reaction mixture was obtained.

The reaction mixture was analyzed by a liquid chromatography to find 81% of anthrone, 8.0% of anthraquinone, 5.2% of anthracene, 0.3% of 1,4-dihydroanthrahydroquinone and 5.5% of the other components. The yield of anthrone was 82 mole %.

EXAMPLE 2

The process of Example 1 was repeated except varying the temperature and the reaction time. The results are shown in Table 1.

Table 1

| Test No. | Temp. (° C) | Time (min.) | Conversion (mole %) | Yield (mole % to THAQ) | | | |
|---|---|---|---|---|---|---|---|
| | | | | Anthrone | Anthraquinone | DHAHQ | Others |
| 1 | 200 | 120 | 30 | <5 | <5 | 14 | — |
| 2 | 250 | 120 | about 100 | 43 | 17 | 18 | 22 |
| 3 | 300 | 90 | " | 63 | 9 | 2 | 26 |
| 4 | 300 | 180 | " | 81 | 8 | 0 | 11 |
| 5 | 350 | 60 | " | 49 | 21 | 0 | 30 |

EXAMPLE 3

In the autoclave of Example 1, 1.1 g of 1,4-DHAHQ was charged and air was purged with nitrogen gas.

The autoclave was closed and heated at 300° C. The content was liquefied for several minutes and a gas was generated from the liquid. After heating it for 60 minutes, the autoclave was cooled and the pressure was decreased to the atmospheric pressure and water remained in the autoclave was vaporized to remove it and 1.05 g of the reaction mixture was obtained.

The reaction mixture was analyzed by a liquid chromatography to find 90% of anthrone, 1.6% of anthraquinone, 1.5% of anthracene and 0.3% of the unreacted material. The yield of anthrone was 93 mole %.

EXAMPLE 4

The process of Example 3 was repeated except varying the temperature and the reaction time. The results are shown in Table 2.

Table 2

| Test No. | Temp. (° C) | Time (min.) | Conversion of DHAHQ (mole %) | Yield (mole % of DHAHQ) | | |
|---|---|---|---|---|---|---|
| | | | | Anthrone | Anthraquinone | Others |
| 1 | 150 | 180 | 18.1 | 31.0 | 44.3 | 24.7 |
| 2 | 200 | 60 | 95.6 | 58.2 | 19.1 | 22.7 |
| 3 | 250 | 60 | 97.8 | 67.3 | 7.5 | 25.2 |
| 4 | 300 | 30 | 99.8 | 89.4 | 1.9 | 8.7 |
| 5 | 350 | 30 | 100 | 82 | 4.3 | 13.7 |
| 6 | 400 | 10 | 99.7 | 82 | 6.1 | 11.9 |
| 7 | 450 | 10 | 100 | 74 | 5.7 | 20.3 |

EXAMPLE 5

A glass tubular reactor having an inner diameter of 2 cm and a length of 10 cm was equipped with a discharge gas outlet tube consisting of a 100 ml condenser, a nitrogen gas inlet and a silica gel column for adsorbing water.

Into the reactor, 1.62 g of 1,4-DHAHQ was charged and nitrogen gas was fed so as to counter-flow air and the reactor was placed in a metal block bath. The reactor was heated at 250° C for 60 minutes. The reaction mixture was cooled to obtain 1.48 g of the reaction mixture and 0.11 g of water adsorbed on silica gel. The reaction mixture was pulverized and uniformly mixed and was analyzed by a liquid chromatography. The results are shown in Table 3.

Table 3

| Anthrone | 69.0% |
|---|---|
| Anthraquinone | 8.3% |
| Anthracene | 0.2% |
| Unreacted material | 0.6% |
| Others | 21.9% |

The yields to DHAHQ obtained from the analysis were as follows.

| Anthrone | 68.8 mole % |
|---|---|
| Anthraquinone | 7.7 mole % |

EXAMPLE 6

In a 50 ml round bottom flask equipped with a stirrer, a reflux condenser and a thermoseter, which was purged with nitrogen gas, 2.5 g of 1,4,4a,9a-THAQ and 25 g of glycerin were charged. The flask was sucked in vacuum and nitrogen gas was fed to seal from air.

The mixture was heated under stirring at 250° C for 0.5 hour. After the reaction, the reaction mixture was dispersed into cold water. The precipitated crystals were filtered and washed with water and dried at 80° C to obtain 2.16 g of greenish gray crystals.

The purity of anthrone was 84.2% and the yield of anthrone was 79.5%.

EXAMPLE 7

The process of Example 6 was repeated except using 1,4-DHAHQ instead of THAQ to obtain 2.20 g of the product. The purity of anthrone was 93.0% and the yield of anthrone was 89.4%.

EXAMPLE 8

In the reactor of Example 1, purged with nitrogen gas, 2.0 g of 1,4,4a,9a-THAQ and 5 g of methylnaphthalene were charged and the reactor was closed. The reaction was performed at 230° C for 5 hours to obtain 1.56 g of the product. The yield of anthrone was 85.5%.

EXAMPLE 9

In the reactor of Example 1, 1.0 g of 1,4,4a,9a-THAQ and 5.0 g of quinoline were charged in nitrogen atmosphere and the reactor was closed. The reaction was performed at 238° C for 5 hours and then at 260° C for 2.5 hours.

After the reaction, the reactor was cooled and the reaction mixture was diluted with a dilute hydrochloric acid. The precipitated crystals were filtered and washed with water and dried to obtain 0.79 g of gray brawn crystals. The purity of anthrone was 55.1% and the yield of anthrone was 47.6%. The impurities of anthracene and anthraquinon were found.

EXAMPLE 10

In the flask of Example 6, 2.5 g of 1,4,4a,9a-THAQ and 25 ml of glycerin and 0.19 g of sodium hydroxide were charged in nitrogen atmosphere. The reaction was performed at 150° C for 1 hour in nitrogen atmosphere.

After the reaction, the reaction mixture was neutralized with acetic acid and it was diluted with water. The precipitated crystals were filtered and washed with water and dried at 80° C to obtain 2.24 g of greenish gray crystals. The purity of anthrone was 93.3% and the yield of anthrone was 91.2%.

The process was repeated except using 1,4-DHAHQ instead of THAQ. As the results, the purity of anthrone was 94.0% and the yield of anthrone was 92.0%.

EXAMPLE 11

The process of Example 10 was repeated except using n-butyl alcohol instead of glycerin and reacting at 115° C for 8 hours to obtain 2.18 g of the product. The purity of anthrone was 85.0% and the yield of anthrone was 81.0%.

EXAMPLE 12

The process of Example 10 was repeated except using 3.6 ml of triethylamine instead of sodium hydroxide to obtain 2.22 g of the product. The purity of anthrone was 79.6% and the yield of anthrone was 77.3%.

EXAMPLE 13

In the reactor of Example 1, 2.12 g of 1,4,4a,9a-THAQ and 5.2 g of 10% aqueous solution of sodium hydroxide were charged in nitrogen atmosphere, and the reactor was closed. The reaction was performed at 160° C for 4 hours. The reaction mixture was cooled and neutralized with acetic acid in nitrogen atmosphere. The precipitated crystals were filtered and washed with water and dried to obtain 1.92 g of crystals. The purity of anthrone was 89.5% and the yield of anthrone was 88.6%.

What is claimed is:

1. A process for producing anthrone which consists essentially of intramolecularly condensing a hydroanthraquinone by heating said hydroanthraquione in vacuo or in the presence of an inert gas, and in the absence of oxygen, wherein said hydroanthraquinone is 1,4,4a,9a-tetrahydroaquinone or 1,4-dihydroanthrahydroquinone and wherein when said hydroanthraquinone is tetrahydroanthraquinone the reaction is effected at a temperature of higher than 200° C and when said hydroanthraquinone is dihydroanthrahydroquinone, the reaction is effected at a temperature of higher than 150° C.

2. A process for producing anthrone according to claim 1 wherein said hydroanthraquinone is tetrahydroanthraquinone or its isomer of dihydroanthrahydroquinone.

3. A process for producing anthrone according to claim 1, wherein said hydroanthraquinone is 1, 4, 4a, 9a-tetrahydroanthraquinone.

4. A process for producing anthrone according to claim 1 wherein said hydroanthraquinone is 1, 4-dihydroanthrahydroquinone.

5. A process for producing anthrone according to claim 1 wherein said inert gas is selected from the group consisting of nitrogen, rare gas and carbon dioxide.

6. A process for producing anthrone according to claim 1 wherein when said hydroanthraquinone is tetrahydroanthraquinone the reaction is effected at a temperature of from 200° to 350° C.

7. A process for producing anthrone according to claim 1, wherein when said hydroanthraquinone is dihydroanthrahydroquinone, said reaction is effected at a temperature of from 170° to 500° C.

8. A process for producing anthrone according to claim 1 wherein the intramolecular condensation is carried out in the presence of an inert solvent at higher than 100° C.

9. A process for producing anthrone according to claim 8, wherein the intramolecular condensation is carried out in the presence of an inert solvent at a temperature of from 130° to 350° C.

10. A process for producing anthrone according to claim 8 wherein the intramolecular condensation of the hydroanthraquinone is carried out in the presence of an inert solvent with a base.

11. A process for producing anthrone according to claim 8 wherein said inert solvent is polyhydric alcohol.

12. A process for producing anthrone according to claim 8, wherein said inert solvent is a monohydric alcohol.

13. A process for producing anthrone according to claim 8 wherein said inert solvent is water or an aqueous solution.

14. A process for producing anthrone according to claim 8 wherein said inert solvent is an amine.

15. A process for producing anthrone according to claim 5 wherein said inert solvent is nonpolar solvent.

* * * * *